United States Patent [19]
Feldt

[11] Patent Number: 5,800,580
[45] Date of Patent: Sep. 1, 1998

[54] SUPPORT CAGE FOR GLASS FIBER BAG FILTER FOR GAS FILTRATION

[76] Inventor: Klas-Goran Feldt, Ljungstigen 4c, 30270 Halmstad, Sweden

[21] Appl. No.: 744,158

[22] Filed: Nov. 12, 1996

Related U.S. Application Data

[63] Continuation-in-part of Ser. No. 329,564, Oct. 26, 1994, abandoned.

[30] Foreign Application Priority Data

Oct. 27, 1993 [DE] Germany .................. 9316420 U

[51] Int. Cl.6 ............................................. B01D 46/02
[52] U.S. Cl. ........................... 55/378; 55/379; 55/381
[58] Field of Search ........................... 55/378, 379, 381

[56] References Cited

U.S. PATENT DOCUMENTS 3,747,307  7/1973  Peshina et al. .
4,141,128  2/1979  Wonderling .................. 55/379 X
4,231,770  11/1980 Johnson, Jr. .................. 55/302
4,247,313  1/1981  Perry, Jr. et al. ............. 55/379 X
4,259,095  3/1981  Johnson, Jr. .................. 55/379 X
4,290,790  9/1981  Okubo ............................. 55/379

FOREIGN PATENT DOCUMENTS 0026641  4/1981  European Pat. Off. .
0352188  1/1990  European Pat. Off. .
2625416  12/1977 Germany .

Primary Examiner—Krisanne Thornton
Attorney, Agent, or Firm—Gary A. Samuels

[57] ABSTRACT

A filter assembly for gas filtration including a support cage and a filter bag made of, or which includes, a fabric containing fiberglass yarns. The support cage has widely spaced vertical supports which provide filter bag support surfaces having a large radius of curvature. The wide support areas reduce damage to the filter bag material from cyclic bending and flexing.

26 Claims, 4 Drawing Sheets

SUPPORT CAGE FOR GLASS FIBER BAG FILTER FOR GAS FILTRATION

This is a continuation-in-part of application Ser. No. 08/329,564, filed Oct. 6, 1994 now abandoned.

FIELD OF THE INVENTION

The invention relates to filtering apparatus for filtration of solids from a stream of flowing gas. More particularly, to assemblies which include tubular baglike filters positioned around cagelike supports, and which are singly or multiply mounted in filter housings or "bag houses."

BACKGROUND OF THE INVENTION

Bag filters or filtering tubes are commonly used in industrial dust extraction systems. Such a filter consists essentially of a tube-like filter medium, or "filter bag", placed around a support cage which provides required mechanical stability to the bag filter. Bag filters of this type have a length of approximately one meter or more and a diameter in the range of approximately 100 to 200 millimeters. The bag filters may be mounted singly in a housing, but are generally mounted in a large housing, or "bag house", which includes a multiplicity, sometimes many hundreds, of such tubular bag filters. In use, particulate-laden gas is directed against the outer surface of the gas permeable filter bags. The particles entrained in the gas stream are removed by the filter medium and accumulate on the surface of the filter bag. Periodically, the retained particles are dislodged from the filter bag by means such as mechanical shaking or, preferably, by directing a reverse pulse or flow of gas against the inner surface of the filter bag to cause the bag to flex outwardly, thereby cleaning the filter bags and prolonging their use-life. Such cleaning methods can subject the filter bag material to relatively high degrees of mechanical stress.

Most conventional filter bag materials, for example, in which woven, non-woven, or felt fabrics of polyester, polypropylene, polyimide, acrylics, and the like, are used as the filter medium, or as support layers for filtration membranes, can withstand the stresses associated with the cleaning methods and provide satisfactory use-lifetimes. However, when the filter bag material comprises woven fiberglass fabrics such cleaning methods can result in severe damage to the fiberglass fabric and significantly shortens the service life of the filter bag. Due to the inherent stiffness, brittleness, and length of the glass fibers from which they are made, fiberglass fabrics are relatively weak and exhibit very low fatigue properties under cyclic bending over a small radius. Despite these shortcomings, fiberglass fabrics are frequently the material of choice as a gas filtration medium, or support for a filtration membrane, for use in filtration of high temperature and/or corrosive gas streams.

A conventional support cage or support basket used in such a bag filter is an open, roughly cylindrical, construction which consists essentially of a large number of wires, each wire having a diameter of approximately 3 to 4 millimeters, which extend vertically between a base plate and a cover plate of the support cage. The vertical wires defining the circumference of the cylindrical cage, being relatively easily deformed, are usually held in position and supported by wire hoops welded or brazed to the inward facing surfaces of the wires. The vertical wires of the cage are generally spaced about 1.5 to 3 centimeters apart circumferentially, and the supporting horizontal hoops spaced vertically about 10 to 25 centimeters apart. As noted above, conventional filter bag materials work quite satisfactorily with such support cages.

However, when a filter bag comprising a fiberglass fabric is used, such support cages have drawbacks which limit the performance of the filter bag. The fiberglass fabrics that are used include materials which are weak from a mechanical perspective so that a large number of wires are required for support. If an insufficient number of wires are provided, the glass fiber weaves may break due to their relatively small fatigue strength under cyclic bending stresses over the small radius of the wires, particularly when the bag filter is cyclically flexed and cleaned with a back-pulse of compressed air. When bag filters are cleaned by pulse jet cleaning, the filter material is impacted by a pulsing stream of air from the inside of the filter bag so that the layer of dust deposited on the outer surface is flung out at a high speed by the flexing of the material caused by the pulses of compressed air. Furthermore, the presence of the horizontal support hoops, so near to the outer circumference of the cage, severely limits the distance over which the filter bag material can flex without impacting and rubbing against them. To reduce the angles over which the filter bag flexes between filtration and cleaning modes, and to reduce harmful effects of impact and abrasion, it is necessary to fit the filter bag quite tightly around the vertical wire supports of the support cage. This lowers the flex distance of the filterbag in the span between the wire supports, but also reduces the cleaning effect of the back pulse of air. In the case of filter bag materials comprising fiberglass fabric, it has actually been shown that the glass fiber weave or non-woven fabric is worn to a substantial degree due to self-abrasive motions of the fiberglass yarns against themselves, as well as by impact and abrasion of the wires of the support cage, in particular, against the horizontal wire hoops. The result is that the service life of such filter bag material is prematurely shortened. This is particularly true when glass fiber bag filters are used in industrial dust extraction systems for the filtration of hot gases where it has previously been necessary to replace these bag filters at relatively short intervals.

Such difficulties and problems are primarily attributed to the commercially available support cages consisting of many wires. Such a construction of a wire support cage is shown in FIG. 1. This figure shows a cross-section view of the cage 30 with numerous vertical support wires 32 and a horizontal support hoop 33. Typically these wires each have a diameter of 2-4 millimeters.

In U.S. Pat. No. 4,259,095 (to Johnson, Jr.) are shown filter bag supports having different configurations than the conventional wire cages described above. These devices combine the functions of supporting and holding the filter bag in an open tubular configuration and for diffusing and distributing air throughout the filter bag when a periodic reverse purge of air is directed into it. The support/diffusers have complex shapes of sheet metal formed as a unitary piece, extending the full distance between top and bottom plates, which provide radially outward-projecting peripheral portions for engaging the surrounding filter bag and an inner enclosed region into which cleaning air pulses are introduced. Numerous perforations in the sheet metal provide for outward distribution of pulsed air to the filter bag. An advantage of these configurations is that the outwardly projecting portions are widely spaced apart and permit the filter bag material to flex over a long distance which results in improved cleaning. A disadvantage, however, is that, even though the tips of the projecting portions are enlarged and rounded to reduce abrasion of the filter bag, the radius of the tips is quite small and, due to the greater flexing distance permitted, the angle over which the filter bag material cycles during back-pulse induced flexing is quite large. This combination is known to cause filterbag materials comprising fiberglass fabric to fail prematurely. A further disadvantage is that these configurations absorb a portion of the energy of back-pulsed air before it reaches the filter bag. Additionally, the constructions are relatively heavy and complex which leads to increased manufacturing cost.

There is a need for a new construction of a support cage for filter bags comprising fiberglass fabric wherein the cleaning capacity of such filter bags with pulse jet cleaning is substantially improved, the relatively low fatigue strength of fiberglass fabric under cyclic bending stresses is taken into account, and damage to the fiberglass caused by self-abrasive motion as well as impact and abrasion against the support cage is substantially reduced so that the service life of filter bags containing yarns or fabric of fiberglass can be substantially lengthened.

SUMMARY OF THE INVENTION

The invention is a filter bag assembly for use in gas filtration comprising a tubular fiberglass-containing filter bag and a support assembly. The support assembly comprises a closed base plate, a cover plate, and at least one section comprising a plurality of elongated vertical supports having outward-facing curved surfaces; the vertical supports extending between the base plate and cover plates, axially essentially parallel to each other, and disposed such that, for circular or regular polygonal shapes, they are circumferentially evenly spaced and radially equidistant from the center points of the plates. In a support assembly having a shape in which the outermost points are not described by a single radius, for example, an oval-shape, the spacing of the vertical supports is adjusted to accommodate the different radii of curvature.

In a preferred embodiment the supports are pipes or tubes having outside surface radii relative to the inside surface radius of the filterbag in the range 1 to 4 to 1 to 16. Support pipes having such radii of curvature ensure that wide support areas to hold the filter bag in a tubular shape are provided by each support's outer surface. Each section of vertical support pipes further comprises at least one intermediate horizontal holder, or spider, to ensure proper spacing and alignment of the vertical supports and to provide increased rigidity to the section. The horizontal holder, or spider, which is joined to the vertical support pipes by radially extending connector bars, has an open recessed region between the connector bars which provides for unimpeded flexing of the filterbag as it cycles between cleaning and filtration modes.

Another embodiment of a support cage is further provided wherein the pipes forming contiguous support sections have equal cylindrical cross-sections and essentially identical spacing and alignment which are joined at corresponding pipe ends by a slip-fit of pipe ends over projecting cylindrical inserts fixed to the mating ends of corresponding pipes.

DETAILED DESCRIPTION OF THE INVENTION

Figure 1:
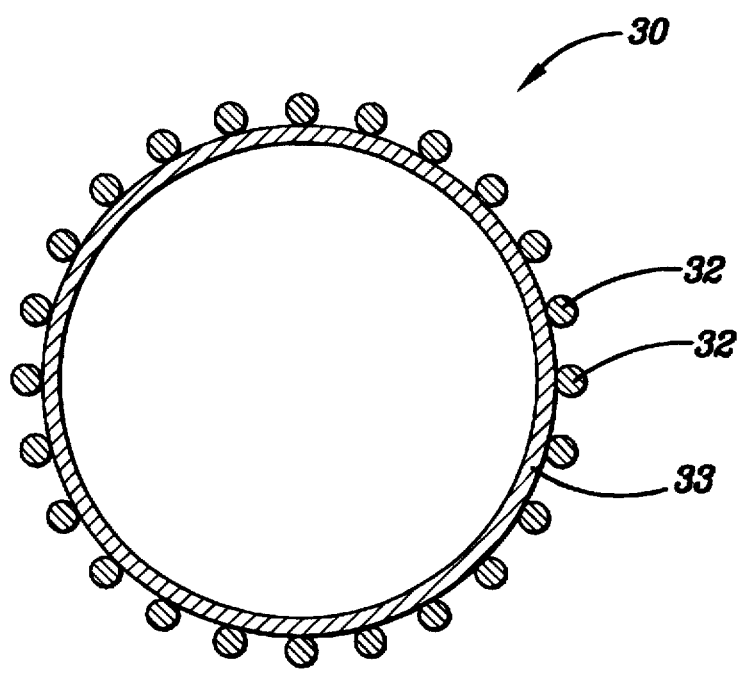
FIG. 1 shows a schematic cross-sectional view of a conventional wire support cage known in the art.
Figure 2:
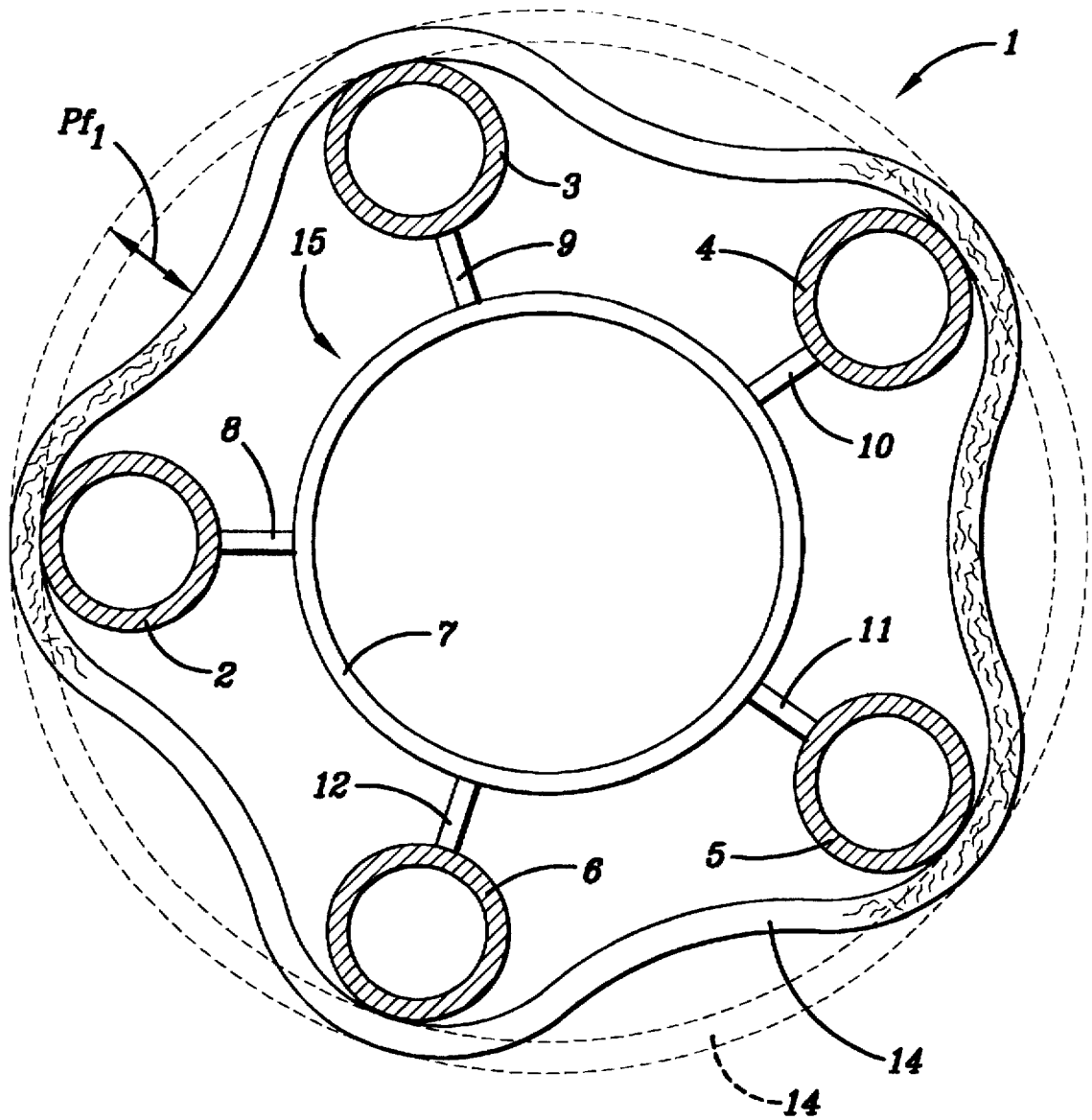
FIG. 2 shows a schematic cross-section of the filter assembly taken through a portion containing a horizontal support spider.

The filter assembly of the invention is best understood by reference to the accompanying drawings. FIG. 2 shows a schematic cross-section of the filter assembly taken through a portion containing a horizontal support spider. The drawing illustrates filter bag 14 surrounding and supported by support cage 15. Filter bag 14 is shown in both filtration mode (solid lines), in which the gas to be filtered enters the bag from the outside, and cleaning- or flex-mode (dotted lines) resulting from, for example, a reverse direction air pulse. The maximum distance $Pf_1$ over which a portion of the filter bag flexes is shown by the double-ended arrow. Vertical support pipes 2, 3, 4, 5, 6 are joined to and held in position by a spider 19 (FIG. 3) comprising an open recessed support hoop 7 and connector bars 8, 9, 10, 11, 12.

Figure 3:
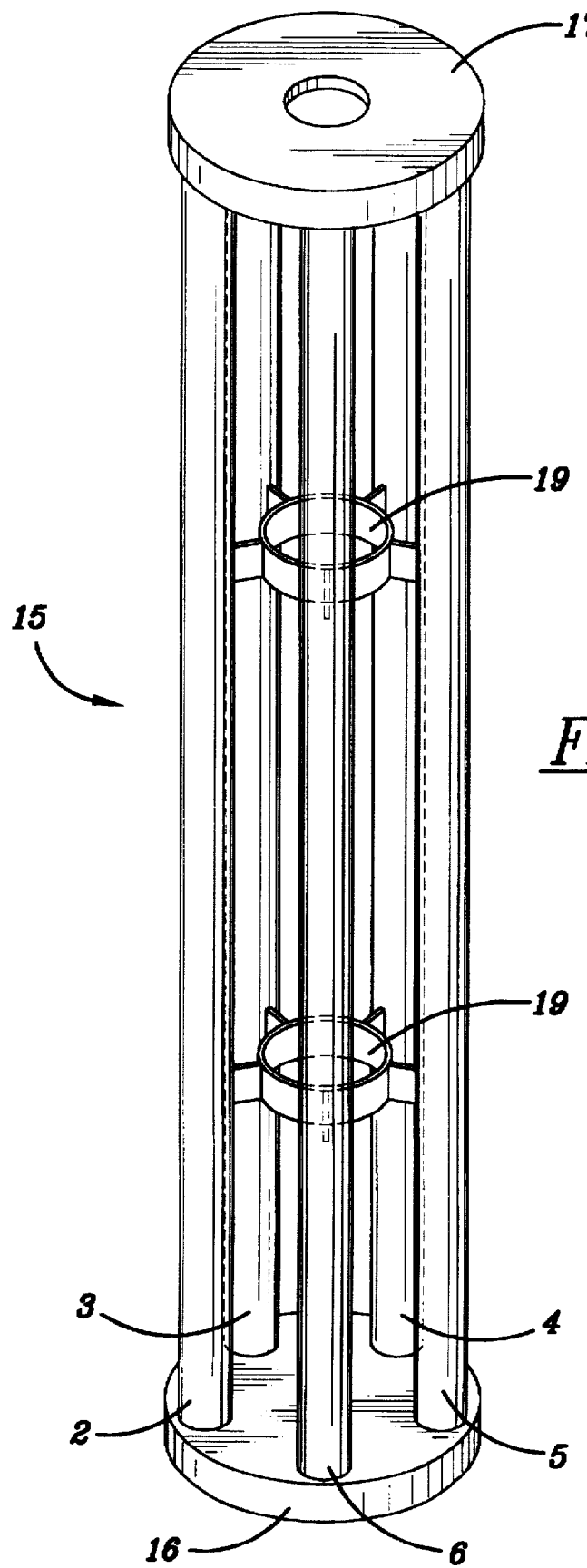
FIG. 3 shows a schematic perspective view of a complete support cage.
Figure 4:
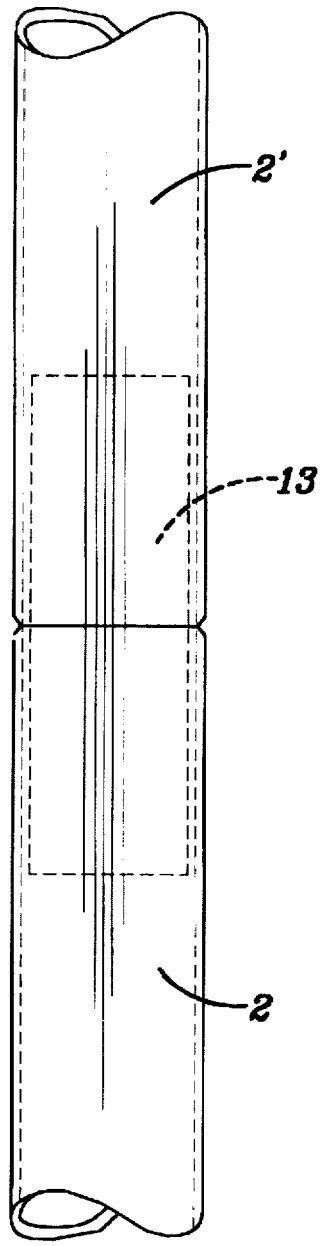
FIG. 4 shows a side view of two support pipes assembled by a slip-fit of one support pipe over an insert fixed to the other support pipe.

FIG. 3 is a perspective view of a complete support cage 15 which illustrates a typical arrangement of the components of the cage. Vertical support pipes 2–6 are connected at one end to cover plate 17 having an outlet opening, and at the opposite end to base plate 16. At intermediate positions between the ends the support pipes are joined to and held in position by horizontal support spiders 19. The vertical support pipes are disposed such that they are circumferentially evenly spaced and radially equidistant from the center points of the plates and the support spiders. The length of the support cage is generally in the range of 1 to 3 meters, but may be shorter or longer as desired. The support cage may be made as a single section of vertical support pipes as shown in FIG. 3, or made in multiple contiguous sections of vertical support pipes connected at one or more locations between the end plates. A method for connecting contiguous sections of groups of vertical support pipes is shown in FIG. 4, in which an end of pipe 2 is connected to an end of pipe 2' by a slip fit over insert 13 which is rigidly attached to one of the pipe end portions, for example, by welding, brazing, or press fitting. By "slip-fit" is meant that clearances between the mating pieces are sufficiently large such that they fit together easily, without interference, yet sufficiently small that lateral movement of the mating pieces relative to each other is minimized. Typical radial differences between mating sufaces are in the order of 0.1 to 0.25 millimeters. This pipe-end joining method results in practically invisible junctions, which also have excellent lateral stability. Any suitable connection means may be used so long as the outside diameters of the pipes at the junctions are well matched in order to present an essentially unchanged surface curvature to the filter bag across the junction. When the support cage consists of a single vertical pipe section, the horizontal support spiders are generally spaced about 50 to 100 cm apart, or away from an end plate. When multiple vertical pipe sections are used, a horizontal support spider may be located near the junctions of the sections so that they may be used in holding contiguous sections together. In this case the spacing between adjacent spiders across a junction may be somewhat less than 50 cm for convenience.

The support cage 15 is made of metal, generally a steel or stainless steel, but can also be made of nickel, titanium, or other formable metals and their alloys. Choice of the materials for the support cage are, accordingly, made in view of the projected service environment. Dimensions of the component parts of the support cage, except for the outside diameters of the vertical support pipes 2–6 and the perimeter of the open recessed support hoop 7, are chosen according to mechanical considerations to provide required strength and rigidity, yet provide a structure as open as possible so as to minimally impede or disturb the flow of filtered gas and reverse gas flow pulses through the filter assembly. The wall thickness for any of the pipes is from about 0.5 millimeters to about 2.5 millimeters. As FIGS. 2 and 3 further show, pipes 2, 3, 4, 5, and 6 are joined to a ring-shaped holder 7 by a corresponding number of bar-shaped connectors 8, 9, 10, 11, and 12 whereby each of these connecting bars extends radially from the recessed ring-shaped support 7 to the surface of each of pipes 2, 3, 4, 5, and 6. The thickness or diameter of each of connectors 8–12 is about 2–4 millimeters.

As noted earlier, it is an object of the invention to provide a filterbag assembly comprising fiberglass fabric wherein the cleaning capacity of such filter bags with pulse jet cleaning is substantially improved, the relatively low fatigue strength of fiberglass fabric under cyclic bending stresses is taken into account, and damage caused by abrasive motion against the support cage is substantially reduced so that the service life of filter bags containing fiberglass fabric can be substantially lengthened.

It has been found that to do so requires construction of a support cage which creates substantially more favorable support conditions for the filter medium than heretofore available. In particular, the space between circumferentially adjacent vertical supports should be substantially larger than available from commercially available cages with support baskets constructed of wires. It is equally important to increase the circumferential distance over which the inside of the filter bag is in contact with each vertical support compared to commercially available cages. It is furthermore important that there should be no impediment against which the inside of the filter bag can impact or rub when flexing. It is also desirable that the support structure be as open as possible so as to minimally impede or disturb the flow of filtered gas and reverse gas flow pulses through the filter assembly. As a result of these differences, the flexing distance and movement characteristics of the filter medium placed in the form of a tube around the support cage are substantially improved which improves the cleanability of the filter bag compared to conventional assemblies. Furthermore, a larger radius of curvature of the circumferential support area of each vertical support provides a much longer support distance and significantly lowers the bending stress applied to the filter bag during a flexing step, thereby reducing fatigue failures due to cyclic bending stresses and increasing the durability and service life of the filter bag. The absence of any impediment to flexing motion of the filter bag likewise improves durability and service life by preventing damage due to impact, abrasion, or sharp bends, as occurs with many conventional support cages.

For use with a filter bag having a nominal diameter of 100 to 200 millimeters, and in contrast to support cages having a plurality of wires (in the range of between 16 to 20) where each wire is approximately 2–4 millimeters in diameter and the filter medium contacts each wire over a very small surface area, a preferred embodiment of the inventive support cage has a low number of vertical support pipes, in the range of between 4 to 10 and preferably between 5 and 6, each pipe having an outside diameter in the range between 10 to 25 millimeters, preferably between 15 to 20 millimeters. Also, in contrast to the minimal contact between filter medium and wires of conventional assemblies, the inventive support cage and surrounding filter bag is sized so that a support area of at least 10%, and up to 25% or more, of the circumference of each vertical support pipe is in contact with the filter medium during the filtration mode. Thus, the width of the support area extending over the full length of each support pipe is at least from about 3 to about 8 millimeters, and can be up to about 20 millimeters or more. The number, spacing, and dimensions of the vertical support pipes, and the diameter of the filter bag, are selected such that, when in the filtration mode, at a point equidistant between adjacent supports, the radius of curvature of the filter bag is greater than the radius of curvature of the support pipe outer surface. It has been found that these conditions are achieved when the ratio of the radius of the outer curved surface of the support pipes to the radius of the inner surface of the filter bag surrounding them is in the range of 1:4 to 1:16.

Figure 5:
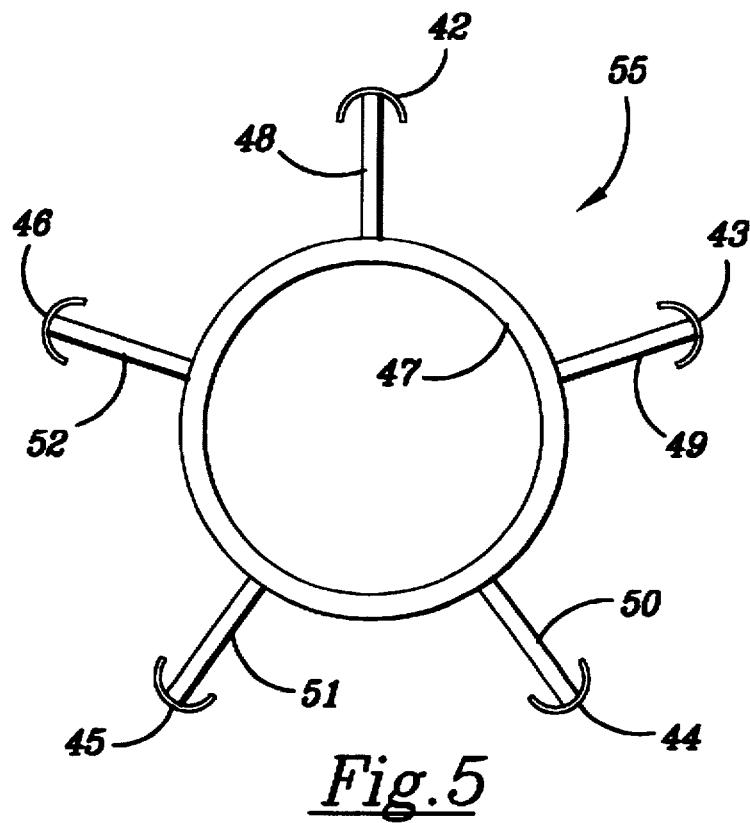
FIG. 5 shows a cross-section of a support cage of the filter assembly taken through a portion containing a horizontal support spider.

Another embodiment of the support cage of the invention is shown in FIG. 5 which shows a cross-section of the support cage 55 taken through a portion containing a horizontal support spider. In this embodiment, vertical supports 42, 43, 44, 45, 46 are formed of curved metal sections having outer surfaces with radii of curvature, and positioned, as described hereinabove for the vertical pipe supports. Such curved metal sections can be obtained, for example, by cutting a tube or pipe, extrusion, formed sheet metal, or other well known methods. As in the earlier description, the curved vertical supports are connected at opposite ends to end plates and, at intervals over their length, are joined to and held in position by at least one horizontal support spider comprising an open recessed support hoop 47 and connector bars 48, 49, 50, 51, 52. This embodiment of the support cage may be preferred when weight considerations are important.

Support cages of the invention permit the use of filter bags having larger diameters and looser fit around the support cage as compared to previously known filter bag assemblies with support cages formed from wires. This is due to the support of the filter medium, in the filtration mode, around the larger radii of curvature of the support surfaces and the large region for unimpeded flexing between adjacent vertical supports. Filter bags with larger diameters have the advantage of improved flexing characteristics of the filter medium which makes improved and more effective cleaning possible. The inventive support cages also make possible the use of lower pulse pressure during compressed air cleaning and less frequent cleaning which contributes to a lengthened service life of the bag filter. Finally, the wide support areas on the pipe outer surfaces provide that, as a result of substantially reduced abrasive motions on the supports, the filter medium is subjected to less wear.

The filter bag 14 can be made of any commercially available filtration material which can withstand the temperature, chemical environment, and mechanical rigors of use. Preferably, however, the filter bag material comprises a fabric containing yarns of glass fibers or yarns of other brittle materials, e.g., carbon fibers or ceramic fibers, which are susceptible to damage by the cyclic bending stresses encountered when used with conventional filter bag support cages. Such filter bags include those in which a fabric comprising yarns of fiberglass, or other brittle material, serves as the filtration medium, or those in which such a fabric is used as a support for a porous filtration membrane; for example, a porous expanded polytetrafluoroethylene membrane. Filter bags comprising porous expanded polytetrafluoroethylene membranes laminated to support layers comprising fiberglass yarns are commercially available under the GORE-TEX® brand name, manufactured by W. L. Gore & Associates, Inc.

I claim:

1. A filter bag assembly for gas filtration comprising:

(a) a tubular filter bag, having an inner surface and an outer surface, and (b) a support assembly comprising (i) a closed base plate, (ii) a cover plate with central outlet, (iii) a plurality of vertical supports extending between the closed base plate and cover plate, said supports attached to said plates, each said vertical support having an outer curved surface having a radius of curvature relative to the radius definable by the circumference of the inner surface of said tubular filter bag in the range 1 to 4 to 1 to 16.

2. The filter bag assembly for gas filtration as recited in claim 1 wherein the outer radius of curvature of said vertical supports is in the range 5–12.5 millimeters, and the number of vertical supports is in the range 4–10.

3. The filter bag assembly for gas filtration as recited in claim 2 wherein the ratio of the outer radius of curvature of said vertical supports relative to the radius of the inner surface of said tubular filter bag is in the range 1 to 4 to 1 to 16.

4. The filter bag assembly for gas filtration as recited in claim 2 wherein the outer radius of curvature of said vertical supports is in the range 7.5–10 millimeters.

5. The filter bag assembly for gas filtration as recited in claim 3 wherein the outer radius of curvature of said vertical supports is in the range 7.5–10 millimeters.

6. The filter bag assembly for gas filtration as recited in claim 1 wherein the filter bag comprises a woven or non-woven fabric comprising yarns of glass fibers.

7. The filter bag assembly for gas filtration as recited in claim 2 wherein the filter bag comprises a a woven or non-woven fabric comprising yarns of glass fibers.

8. The filter bag assembly for gas filtration as recited in claim 3 wherein the filter bag comprises a woven or non-woven fabric comprising yarns of glass fibers.

9. The filter bag assembly for gas filtration as recited in claim 4 wherein the filter bag comprises a woven or non-woven fabric comprising yarns of glass fibers.

10. The filter bag assembly for gas filtration as recited in claim 5 wherein the filter bag comprises a woven or non-woven fabric comprising yarns of glass fibers.

11. The filter bag assembly for gas filtration as recited in claim 6 wherein the filter bag comprises a porous expanded polytetrafluoroethylene membrane laminated to said fabric.

12. The filter bag assembly for gas filtration as recited in claim 7 wherein the filter bag comprises a porous expanded polytetrafluoroethylene membrane laminated to said fabric.

13. The filter bag assembly for gas filtration as recited in claim 8 wherein the filter bag comprises a porous expanded polytetrafluoroethylene membrane laminated to said fabric.

14. The filter bag assembly for gas filtration as recited in claim 9 wherein the filter bag comprises a porous expanded polytetrafluoroethylene membrane laminated to said fabric.

15. The filter bag assembly for gas filtration as recited in claim 10 wherein the filter bag comprises a porous expanded polytetrafluoroethylene membrane laminated to said fabric.

16. A filter bag assembly for gas filtration comprising:

(a) a tubular filter bag, having an inner surface and an outer surface, comprising a woven or non-woven fabric of glass fibers; and (b) a support assembly comprising (i) a closed base plate, (ii) a cover plate with central outlet, (iii) a plurality of tubular vertical supports extending between the closed base plate and cover plate, said supports attached to said plates such that they are circumferentially evenly spaced and radially equidistant from the center points of said plates, said tubular supports comprised in one or more discrete sections, each said tubular support having an outside diameter relative to the inside diameter of said tubular filter bag in the range 1 to 4 to 1 to 16, wherein, in the filtration mode, the inside surface of the tubular filter bag is in contact with 10 percent or more of the outside surface of each tubular support.

17. The filter bag assembly for gas filtration as recited in claim 16 wherein the diameter of the tubular supports is in the range 10–25 millimeters, and the number of tubular supports is in the range 4–10.

18. The filter bag assembly for gas filtration as recited in claim 17 wherein the ratio of the outside diameter of the tubular supports to the filter bag inside diameter is in the range 1 to 6 to 1 to 8.

19. The filter bag assembly for gas filtration as recited in claim 17 wherein the diameter of the tubular supports is in the range 15–20 millimeters.

20. The filter bag assembly for gas filtration as recited in claim 18 wherein the diameter of the tubular supports is in the range 15–20 millimeters.

21. The filter bag assembly for gas filtration as recited in claim 16 wherein the filter bag comprises a porous expanded polytetrafluoroethylene membrane laminated to a woven or non-woven fabric of glass fibers.

22. The filter bag assembly for gas filtration as recited in claim 17 wherein the filter bag comprises a porous expanded polytetrafluoroethylene membrane laminated to a woven or non-woven fabric of glass fibers.

23. The filter bag assembly for gas filtration as recited in claim 18 wherein the filter bag comprises a porous expanded polytetrafluoroethylene membrane laminated to a woven or non-woven fabric of glass fibers.

24. The filter bag assembly for gas filtration as recited in claim 19 wherein the filter bag comprises a porous expanded polytetrafluoroethylene membrane laminated to a woven or non-woven fabric of glass fibers.

25. The filter bag assembly for gas filtration as recited in claim 20 wherein the filter bag comprises a porous expanded polytetrafluoroethylene membrane laminated to a woven or non-woven fabric of glass fibers.

26. The filter bag assembly for gas filtration as recited in claim 16 wherein said tubular supports are grouped in two or more vertically-contiguous sections, each tubular support comprised in any one of two contiguous sections to be joined having a vertically-projecting insert fixed to an end portion, the projecting portion of said insert having an outside diameter sized to provide a slip-fit into the end portion of the corresponding contiguous tubular support, whereby said sections are joined so as to provide matching external surfaces and so as to substantially prevent lateral movement of said joined sections relative to each other.

* * * * *